(12) United States Patent
Itakura

(10) Patent No.: US 8,819,033 B2
(45) Date of Patent: Aug. 26, 2014

(54) CONTENT PROCESSING DEVICE

(75) Inventor: Toyokazu Itakura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/051,180

(22) Filed: Mar. 18, 2011

(65) Prior Publication Data

US 2012/0066235 A1    Mar. 15, 2012

(30) Foreign Application Priority Data

Sep. 15, 2010  (JP) ................................ 2010-207201

(51) Int. Cl.
*G06F 17/30*     (2006.01)
(52) U.S. Cl.
CPC ................................ *G60F 17/30035* (2013.01)
USPC ........................................................ 707/751
(58) Field of Classification Search
CPC ................................................. G06F 17/30035
USPC ........................................................ 707/751
See application file for complete search history.

(56) References Cited

U.S. PATENT DOCUMENTS

| 8,001,562 | B2 * | 8/2011 | Yamasaki et al. | ................. | 725/24 |
| 2007/0061853 | A1 * | 3/2007 | Kondo et al. | ..................... | 725/89 |
| 2008/0066104 | A1 * | 3/2008 | Murakoshi | ....................... | 725/39 |

FOREIGN PATENT DOCUMENTS

| JP | 11-134345 | | 5/1999 |
| JP | 2005063298 | * | 3/2005 |
| JP | 2008-167018 | | 7/2008 |
| JP | 2009-4994 | | 1/2009 |
| JP | 2012-008789 | | 1/2012 |

OTHER PUBLICATIONS

Japanese Office Action for Japanese Patent Application No. 2010-207201 mailed on Aug. 24, 2012.

* cited by examiner

*Primary Examiner* — Sheree Brown
(74) *Attorney, Agent, or Firm* — Amin, Turocy & Watson, LLP

(57) ABSTRACT

A content processing device includes a first acquisition unit acquiring a content data; a second acquisition unit acquiring a history including a time when a user plays the content data; a first extraction unit extracting a keyword from the content data; a management unit extracting a preference keyword representing a preference of the user from the keyword based on the history, said management unit managing the extracted preference keyword with an importance score; a presentation unit presenting a recommended content data according to a comparison of the keyword and the preference keyword; an update unit updating the importance score of the preference keyword corresponding to the recommended content data selected by the user; and a second extraction unit extracting another recommended content data using the updated importance score.

26 Claims, 11 Drawing Sheets

LIST OF RECOMMENDED SCENES

2009/10/30 NEWS XX, ABOUT 8:42

2009/10/29 NEWS XX, ABOUT 11:04

2009/10/22 MORNING XX, ABOUT 7:21

2009/11/2 XX NEWS, ABOUT 23:35

2009/10/23 FIRST THING IN THE MORNING XX (ASAICHI XX), ABOUT 7:09

2009/11/1 XY TV SHOW, ABOUT 9:15

FIG. 5

LIST OF RECOMMENDED SCENES

| 2009/10/30 NEWS XX, ABOUT 8:42, "WORK SUBDIVISION" | 2009/10/29 NEWS XX, ABOUT 11:04, "SUBDIVIDING PERSON" | 2009/10/22 MORNING XX, ABOUT 7:21, "ILL-CONSIDERED BUDGET" |
| --- | --- | --- |
| 2009/11/2 XX NEWS, ABOUT 23:35, "XX" | 2009/10/23 FIRST THING IN THE MORNING XX (ASAICHI XX), ABOUT 7:09, "WORK SUBDIVISION" | 2009/11/1 XY TV SHOW, ABOUT 9:15, "COMMITTEE MEMBERS IN CHARGE" |

FIG. 6

CONTENT PROCESSING DEVICE

CROSS-REFERENCE TO RELATED APPLICATION

This application is based upon and claims the benefit of priority from Japanese Patent Application No. P2010-207201, filed on Sep. 15, 2010; the entire contents of which are incorporated herein by reference.

FIELD

Embodiments described herein generally relate to a content processing device.

BACKGROUND

There is disclosed a technique for extracting feature information from video data based on a magnitude of audio climax, keywords or the like. For example, using an operational history of a user who viewed/listened to video data, keywords of apparent interest to the user are extracted from data corresponding to scenes that the user viewed/listened to. Importance scores are allocated to the respective keywords based on the user's operational history, and pieces of video data including the keywords having higher importance scores are extracted and presented to the user.

BRIEF DESCRIPTION OF THE DRAWINGS

FIG. 5 is a schematic diagram showing an example of the presentation unit according to the first embodiment;

FIG. 6 is a schematic diagram showing an example of a governor unit according to the first embodiment;

DETAILED DESCRIPTION

Figure 1:
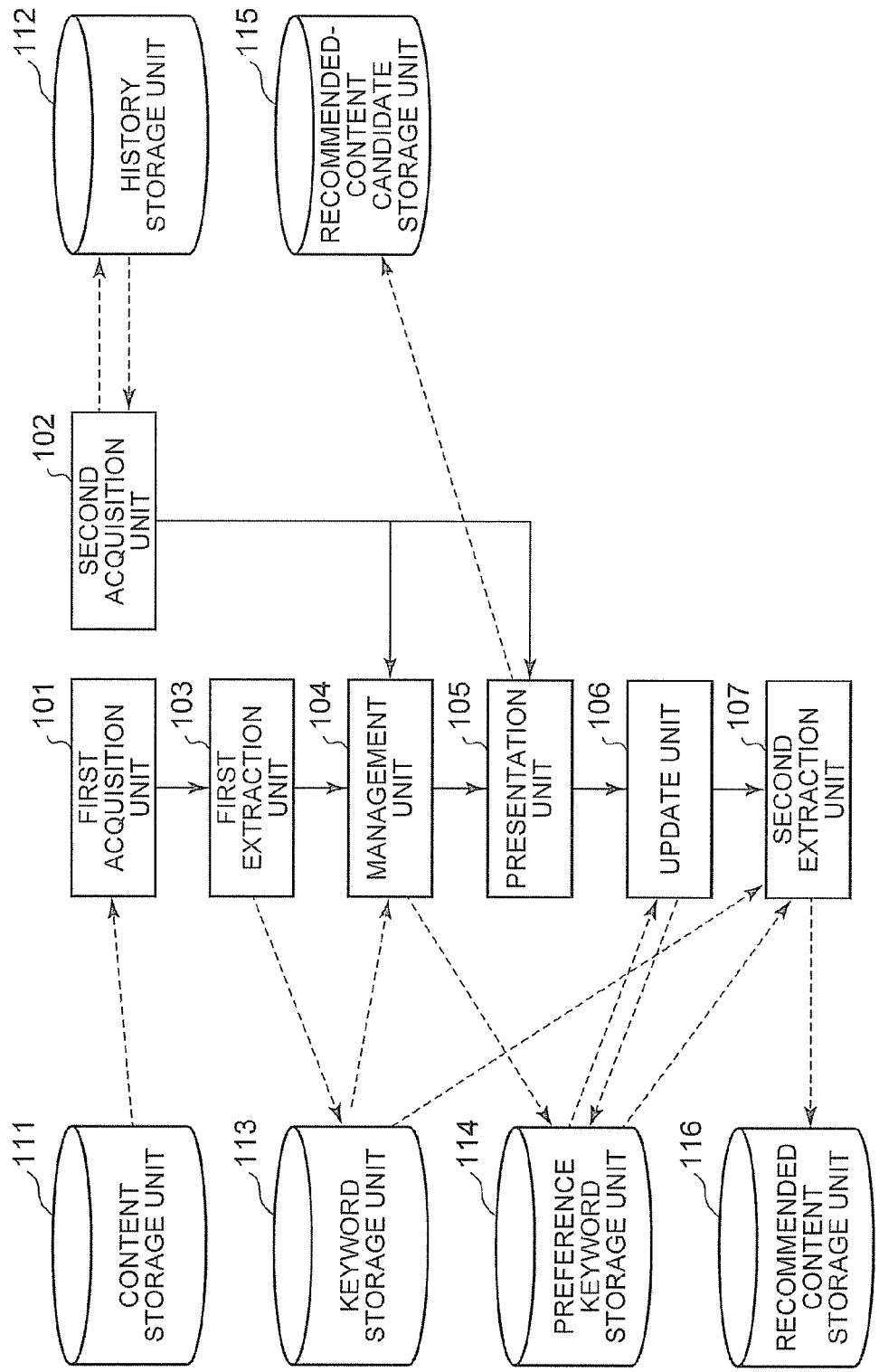
FIG. 1 is a schematic diagram showing a configuration of a content processing device according to an embodiment of the present invention.

Generally, there is present a plurality of keywords extracted from closed-caption data corresponding to the video data viewed/listened to by the user.

Particularly if the keywords are extracted from the closed-caption data, there is a probability that different keywords from those of interest to the user are frequently extracted and that the different keywords are given high importance score. As a result, video data of no interest to the user is often recommended to the user. In these situations, it is desired to present video data of more interest to the user.

It is an object of the present embodiments to provide a content processing device capable of extracting contents of interest to a user while using user's browsing history.

In order to solve the above problem, it is provided that a content processing device includes a first acquisition unit configured to acquire a content including a video and a text; a second acquisition unit configured to acquire a history including user's play start time at which a user starts playing the content and user's play end time at which the user finishes playing the content; a first extraction unit configured to extract a keyword extracted from the text included in the content; a management unit configured to extract a preference keyword representing a preference of the user from the keyword based on the history, and said management unit configured to manage the extracted preference keyword with a predetermined importance score of the preference keyword; a presentation unit configured to compare the keyword with the preference keyword, and said presentation unit configured to extract and to present a recommended-content candidate of the content to the user; an update unit configured to update the importance score of the preference keyword so as to increase the importance score of the preference keyword corresponding to one of the recommended-content candidates selected by the user; and a second extraction unit configured to extracts a recommended content using the updated importance score.

Embodiments of the present invention will be described hereinafter with reference to the drawings.

First Embodiment

A content processing device according to a first embodiment of the present invention will be described with reference to the drawings. Contents refer herein to information viewed/listened to or browsed by a user. For example, the contents refer to information that is a combination of video and audio data about a movie, a TV program or the like. The contents are configured to include a combination of moving images, still images, music, sentences and the like. The content processing device will, be described while taking a processing on sound-containing video data such as television broadcast data and character information accompanying the video data such as text obtained from a closed-caption or the like as an example. The contents are not limited to the television broadcast contents but video data on a network obtained via communication means such as the Internet and text accompanying the video data can be also used as contents. Alternatively, a combination of the television broadcast contents and the network contents can be used as contents. Furthermore, in this embodiment, a processing performed by appropriately reading a history of user's viewing/listening to or browsing the contents, keywords and the like from a storage unit storing the history, the keywords and the like will be described by way of example. If possible, the contents or the like can be sequentially processed using a storage area such as a buffer that temporarily stores data.

FIG. 1 shows a configuration of the content processing device according to the first embodiment. The content processing device includes a first acquisition unit 101 acquiring a content, a second acquisition unit 102 acquiring a user's viewing/listening history and a user's operational history during user's viewing/listening, a first extraction unit 103 extracting keywords from text, a management unit 104 managing preference keywords representing user's favorite and importance scores of the respective preference keywords, a presentation unit 105 extracting recommended content candidates using the keywords extracted from the text and the preference keywords and presenting the candidates to the user, an update unit 106 updating the importance scores, and a second extraction unit 107 extracting recommended contents presented to the user based on the updated importance scores. In this embodiment, an instance in which the content processing device also includes a content storage unit 111 storing contents to be processed a history storage unit 112 storing the user's viewing/listening history and the user's operational history during user's viewing/listening, a keyword storage unit 113 storing words extracted from the text as the keywords, a preference keyword storage unit 114 storing the preference keywords representing the user's favorite, a recommended-content candidate storage unit 115 storing the recommended content candidates to be presented to the user, and a recommended-content storage unit 116 storing recommended contents newly presented to the user.

Operations performed by the content processing device according to the first embodiment will next be described. First, the first acquisition unit 101 acquires a content to be processed from the content storage unit 111 and transmits the acquired content to the first extraction unit 103.

The content storage unit 111 is a database for referring to video data stored in a storage device such as a hard disk of a computer. The content storage unit 111 stores such data as that shown in Table 1. In Table 1, a content ID indicates an ID unique to video data. A date indicates a date when the video data is recorded. If the video data is recorded data on a television broadcast program, the date indicates a date when the television program is broadcast. Start time indicates broadcast start time of the television broadcast program and end time indicates broadcast end time of the television broadcast program. A program name corresponds to a television program name. A storage location represents information on a location where a video data main body is stored such as an address on the storage device, for example, the hard disk of the computer.

TABLE 1

| Content ID | Date | Start time | End time | Program name | Storage location |
|---|---|---|---|---|---|
| 001 | 2009/11/05 | 19:00:00 | 19:30:00 | News XX | C:¥Movie¥001.mp4 |
| 002 | 2009/11/06 | 09:55:00 | 10:30:00 | XX Walking | C:¥Movie¥002.mp4 |
| ... | | | | | |

The first extraction unit 103 extracts words from the text included in the content and stores proper nouns and general nouns such as personal names, place names, places except for postpositional particles in the keyword storage unit 113 as main keywords. Alternatively, the first extraction unit 103 can extract words by separately preparing a keyword dictionary recording proper nouns, general nouns and the like necessary as keywords and comparing words with those included in the dictionary. The first extraction unit 103 transmits the extracted keywords to the management unit 104.

The keyword storage unit 113 is a database that stores keywords extracted from, for example, closed-caption data attached to a television program. Table 2 shows an example of the closed-caption data attached to a television program. In Table 2, a content ID indicates a content ID of the content storage unit 111, start time indicates time when a closed-caption described in the closed-caption data starts to be displayed in video data having the content ID, and end time is time when the closed-caption finishes to be displayed. The closed-caption data shown in Table 2 is broadcast while being attached to closed-captioned broadcast data in, for example, terrestrial digital broadcasting. Table 3 shows keywords extracted from the closed-caption data attached to the video data on the closed-captioned broadcast program. The keyword storage unit 112 stores the keywords extracted from the closed-caption data in these tabular formats. In Table 3, a content ID is the content ID of the content storage unit 111 similarly to Table 3, and keywords appearing from the start time to the end time are stored in the content storage unit 111.

TABLE 2

| Content ID | Start time | End time | Closed-caption data |
|---|---|---|---|
| | | ... | |
| 001 | 0:08:51 | 0:8:53 | In the following manner, work subdivision operation is |
| 001 | 0:08:53 | 0:8:56 | Carried out with participants in the operation sitting face to face with a table among them. |
| 001 | 0:08:56 | 0:8:58 | On both sides, subdividing persons |
| 001 | 0:08:58 | 0:9:00 | Committee members in charge |
| | | ... | |
| 001 | 0:10:43 | 0:10:47 | Based on XX special agreement or the like, |
| 001 | 0:10:47 | 0:10:51 | With XX budget, |
| 001 | 0:10:51 | 0:10:55 | Total amount of ill-considered budget is included in budget bill for next fiscal year |
| 001 | 0:10:55 | 0:10:59 | Submit a request for |
| | | ... | |

TABLE 3

| Content ID | Start time | End time | Keyword |
|---|---|---|---|
| | | ... | |
| 001 | 0:08:51 | 0:8:53 | Work subdivision |
| 001 | 0:08:53 | 0:8:56 | Table |

TABLE 3-continued

| Content ID | Start time | End time | Keyword |
|---|---|---|---|
| 001 | 0:08:56 | 0:8:58 | Subdividing person |
| 001 | 0:08:58 | 0:9:00 | Committee member in charge |
| | | ... | |
| 001 | 0:10:43 | 0:10:47 | XX, special agreement |
| 001 | 0:10:47 | 0:10:51 | XX |
| 001 | 0:10:51 | 0:10:55 | Ill-considered budget |
| 001 | 0:10:55 | 0:10:59 | XX Ministry |
| | | ... | |

Attribute information can be attached to each keyword (noun). For example, to "Tokyo", attribute information "place name" can be attached and to "apple", attribute information "fruit" can be attached. Moreover, if the closed-caption data includes not only text information but also information as to at which position on a screen, in what color, and at what size the closed-caption data is to be displayed, these pieces of information can be added to the keyword. If a plurality of speakers is present and the speakers are distinguishable, speaker information can be added for every keyword. For example, a baseball commentator in baseball broadcast live is distinguished from a play-by-play announcer. An attribute that affects a user's preference can be determined using the attribute information, and a variation width of an importance score of a preference keyword, to be described later, can be adjusted if the importance score is to be calculated.

The second acquisition unit 102 acquires user's viewing/listening history and stores the acquired viewing/listening history in the history storage unit 112. The second acquisition unit 102 transmits the acquired viewing/listening history to the management unit 104. If the user views/listens to a content, the second acquisition unit 102 acquires a user's operational history during user's viewing/listening and stores a part of moving images included in the content (hereinafter, "scenes") in the history storage unit 112. The history storage unit 112 is a database storing the user's content-viewing/listening and operational histories acquired by the second acquisition unit 102.

Figure 2:
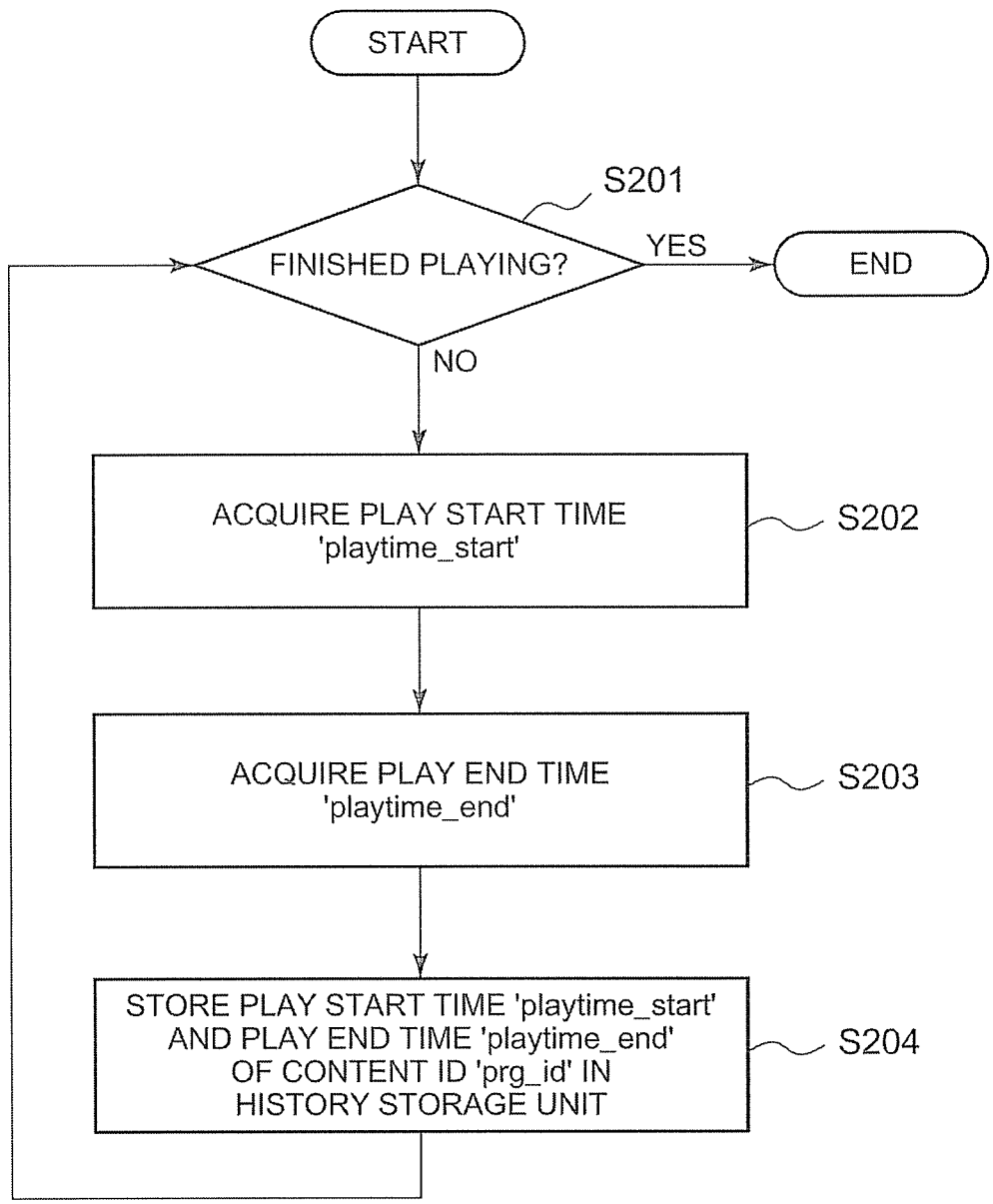
FIG. 2 is a flowchart exemplarily showing an operation performed by a second acquisition unit according to the first embodiment.

FIG. 2 is a flowchart of an operation performed by the second acquisition unit 102. It is assumed that the user views/listens to a content having a content ID=prg_id. If the user has not finished playing the content yet (S201), the second acquisition unit 102 acquires play start time of a target scene (S202). Next, the second acquisition unit 102 acquires play end time (S203). Next, the second acquisition unit 102 stores the play start time and the play end time as well as the content that has the content ID=prg_id and that is being viewed/listened to by the user in the history storage unit 112 (S204). If the user finishes playing back the content (S201), the operation ends.

Table 4 shows data stored in the history storage unit 112. A content ID indicates the content ID of the content stored in the content storage unit 111. Play start time indicates time when the user starts playing the content, and play end time indicates time when the user finishes playing the content. For example, if the user is to play the recorded content, the user not only normally plays the content from the start to the end but also possibly searches an interesting scene, starts playing the interesting scene from the start, and finishes playing the interesting scene when the interesting scene is over. Further, the user possibly searches a next interesting scene in the same content when finishing playing the first interesting scene and continues to perform a viewing/listening operation of play start and play end. In that case, operational histories of pairs of play start and play end appear a plurality of times for one play content, and the second acquisition unit 102 stores a plurality of pairs of play start time and play end time in the history storage unit 112. As a user's viewing/listening search history, a history of play operations other than the normal play such as fast-forward, slow play, repetitive play, pause, stop of fast-forward and play from a specific scene (stop of fast-forward and normal play), play from a specific scene after rewinding, clipping of a scene in an editable device, chapter setting to a specific scene and the like can be recorded in the history storage unit 112.

TABLE 4

| Content ID | Play start time | Play end time |
| --- | --- | --- |
| 001 | 0:08:50 | 0:11:05 |
| 001 | 0:15:23 | 0:19:40 |
| ... | | |

The management unit 104 compares the keywords extracted by the first extraction unit 103 with the user's viewing/listening history, and extracts the keywords corresponding to, for example, the content viewed by the user as the preference keywords. To limit the number of words to be stored as the preference keywords, moving images included in the content can be divided at predetermined time's intervals and a keyword appearing first in each time width can be set as a preference keyword. The management unit 104 stores the extracted preference keywords as well as a predetermined importance score in the preference keyword storage unit 114. It suffices to set an initial value of the importance score to a predetermined value. For example, it suffices to set the importance score to 1.0 at the time of new registration. The management unit 104 transmits the preference keywords to the presentation unit 105.

The preference keyword storage unit 114 stores the preference keywords extracted by the management unit 104. Table 5 shows data stored in the preference keyword storage unit 114. In Table 5 showing the preference keywords, the preference keywords and corresponding importance scores imp_score are stored. If the management unit 104 stores a new preference keyword, an importance score of 1.0 is recorded to correspond to the preference keyword. In an example of Tables 2 and 3, the keywords "work subdivision", "table", "subdividing person", "committee member in charge", "XX", "special agreement", "YY", "ill-considered budget", "ZZ Ministry" are stored as the preference keywords. If each of the preference keywords newly appears, the importance score 1.0 is stored to correspond to the preference keyword.

The presentation unit 105 extracts contents corresponding to, for example, frequently appearing preference keywords as recommended content candidates using the extracted preference keywords, and presents the recommended content candidates to the user. Correspondence between the preference keywords and each content can be determined based on an appearance ratio of the preference keywords for every predetermined time interval with respect to required time (playable time) of moving images included in the content based on the required time. Alternatively, the correspondence can be determined based on whether or not appearance of the preference keywords concentrates on a part within the required time. In another alternative, if a peak of the appearance ratio of a specific preference keyword is present in time intervals of a part of the moving images, the presentation unit 105 can present contents including the corresponding part of the moving images to the user as the recommended content candidates. If the user selects one of the presented recommended content candidates and views/listens to the content candidate, the presentation unit 105 acquires the content viewed/listened to by the user and a corresponding user's viewing/listening history and transmits the content and history to the update unit 106. The presentation unit 105 also stores the recommended content candidates in the recommended-content candidate storage unit 115.

The recommended-content candidate storage unit 115 is a database storing the recommended content candidates extracted by the presentation unit 105. Table 6 shows data stored in the recommended-content candidate storage unit 115. In Table 6, the preference keywords selected by the management unit 104, content IDs extracted based on the preference keywords, and recommended-content candidate start time are stored. For example, a first row of Table 6 indicates that a content ID 005 is a content ID of the content including the keyword "work subdivision" appearing most frequently from 0:04:22

TABLE 5

| Preference keyword | Importance score |
| --- | --- |
| Work subdivision | 1.0 |
| Table | 1.0 |
| Subdividing person | 1.0 |
| Committee member in charge | 1.0 |
| XX | 1.0 |
| Special agreement | 1.0 |
| XX | 1.0 |
| Ill-considered budget | 1.0 |
| XX Ministry | 1.0 |
| ... | |

TABLE 6

| Preference keyword | Content ID | Start time |
| --- | --- | --- |
| Work subdivision | 005 | 0:04:22 |
| Table | 016 | 0:15:31 |
| ... | | |

The update unit 106 updates the importance scores of the preference keywords based on the user's viewing/listening history. For example, the update unit 106 updates the importance score, that is, increases values of the importance scores of the contents viewed/listened to by the user by increasing the preference keywords included in the contents viewed/listened to by the user by a predetermined width. The update unit 106 stores the updated importance scores of the preference keywords in the preference keyword storage unit 114 and also transmits the updated importance scores thereof to the second extraction unit 107.

The second extraction unit 107 extracts a recommended content recommended to the user using the keywords and preference keywords included in the contents based on the updated importance scores, and presents the recommended content to the user. The second extraction unit 17 also stores the recommended content in the recommended content storage unit 116.

As shown in Table 7, information on the recommended content is stored in the recommended-content storage unit 116. For example, a preference keyword, a content ID extracted using the updated preference keyword, and recommended-content start time are stored in the recommended-content storage unit 116.

TABLE 7

| Preference keyword | Content ID | Start time |
| --- | --- | --- |
| Work subdivision | 035 | 0:25:28 |
| ... | | |

The content processing device according to this embodiment extracts a recommended content candidate using each of the keywords included in the closed-caption data corresponding to scenes of the video data viewed/listened to by the user. Furthermore, the content processing device identifies keywords of interest to the user based on which part of each of the recommended content candidates the user viewed/listened to. Therefore, the content extracted using the identified keywords corresponds to the content of interest to the user.

Next, operations performed by the management unit 104, the presentation unit 105, the update unit 106, and the second extraction unit 107 will be described in more detail.

Figure 3:
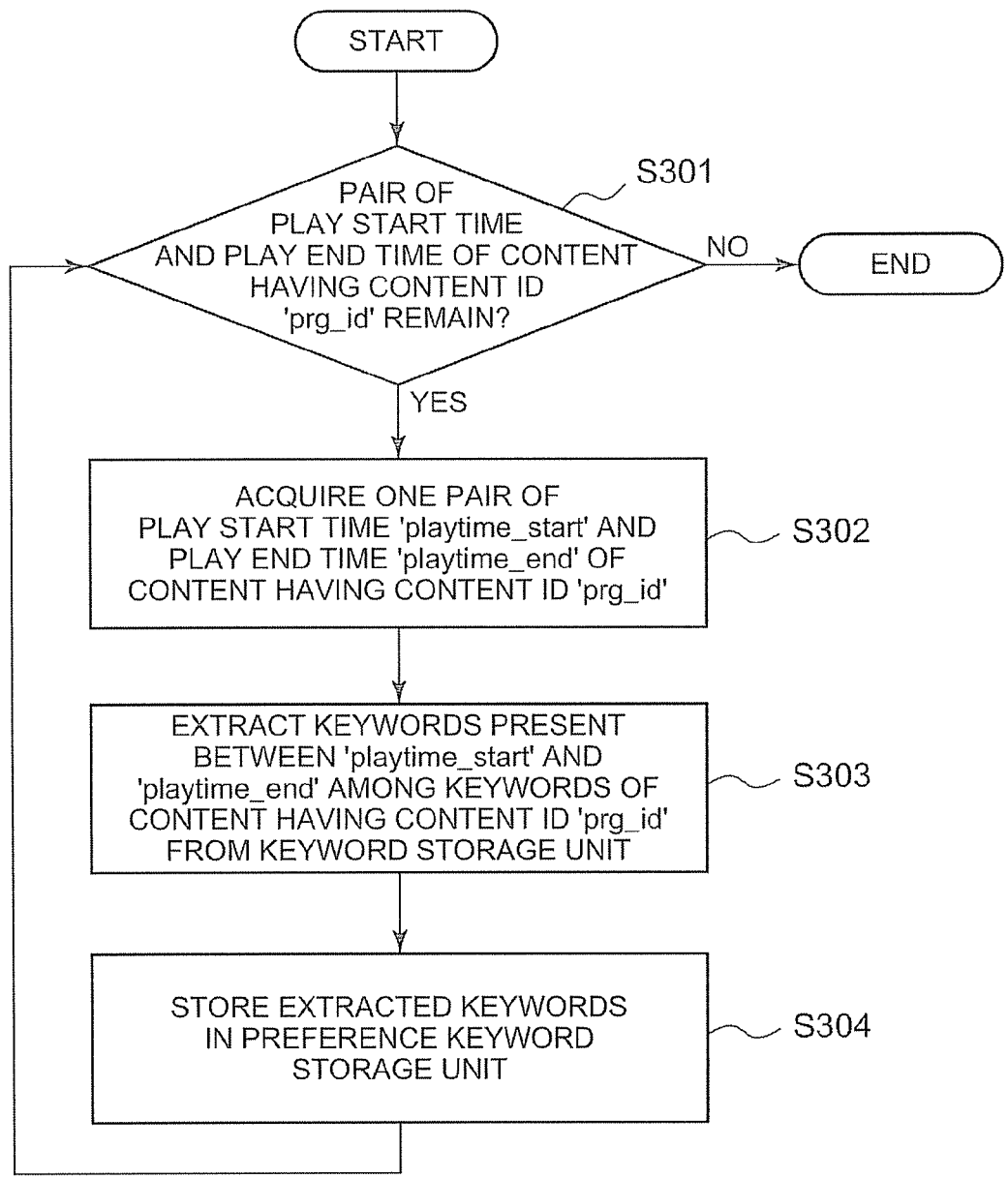
FIG. 3 is a flowchart exemplarily showing an operation performed by a management unit according to the first embodiment.

FIG. 3 is an operation flowchart of the management unit 104. The management unit 104 extracts preference keywords representing user's interest based on the user's viewing/listening and operational histories stored in the history storage unit 112. If a pair of play start time and play end time of the content having the content ID prg_id and viewed/listened to by the user just previously remain in the history storage unit 112 (S301), the management unit 104 acquires a pair of play start time playtime_start and play end time playtime_end of the content having the content ID prg_id from the history storage unit 112 (S302). For example, the management unit 104 acquires the play start time playtime_start=0:08:50 and the play end time playtime_end=0:11:05 of the content played just previously and having the content ID 001 shown in Table 4. Next, the management unit 104 extracts keywords present between playtime_start and playtime_end among the keywords of the content having the content ID prg_id from the keyword storage unit 113. As shown in Table 3, for example, the keywords present between playtime_start=0:08:50 and playtime_end=0:11:05 of the content having the content ID 001 are "work subdivision", "table", "subdividing person", "committee member in charge", "XX", "special agreement", "YY", "ill-considered budget", "ZZ Ministry", and the like. The management unit 104, therefore, extracts these keywords. Since these keywords correspond to the scenes of the content which the user is interested in and viewed/listened to, it is considered that these are keywords reflecting user's interest in some way or other. In the example described herein, it is considered that this user viewed/listened to the scenes with his/her interest in domestic and overseas politics from the keywords corresponding to the scenes viewed/listened to by the user. In this embodiment, the keywords determined to reflect user's interest are referred to as "preference keywords". Next, the management unit 104 stores the extracted preference keywords in the preference keyword storage unit 114 (S304).

At the time of storing each preference keyword in the preference keyword storage unit 114, if the keyword is new, the management unit 104 also stores the preset importance score in the preference keyword storage unit 114 as the importance score of the new preference keyword. In this embodiment, the management unit 114 stores the importance score of 1.0 in the preference keyword storage unit 114 as the importance score of the new preference keyword. If the preference keyword is already stored in the preference keyword storage unit 114, the management unit 104 compares an importance score imp_score_new of the new preference keyword with an already-stored importance score imp_score_old. If imp_score_old>1.0 (that is, the already-stored importance score is higher than 1.0), the management unit 104 sets the importance score imp_score_new equal to the already-stored importance score, that is, imp_score_new=imp_score_old. If imp_score_old<=1.0 (that is, the already-stored importance score is equal to or lower than 1.0), the management unit 104 sets the importance score imp_score_new to 1.0, that is, imp_score_new=1.0. If a new pair of play start time and play end time of the content having the content ID=prg_id does not remain in the preference keyword storage unit 114 (S301), the management unit 104 finishes performing the operation.

Figure 4:
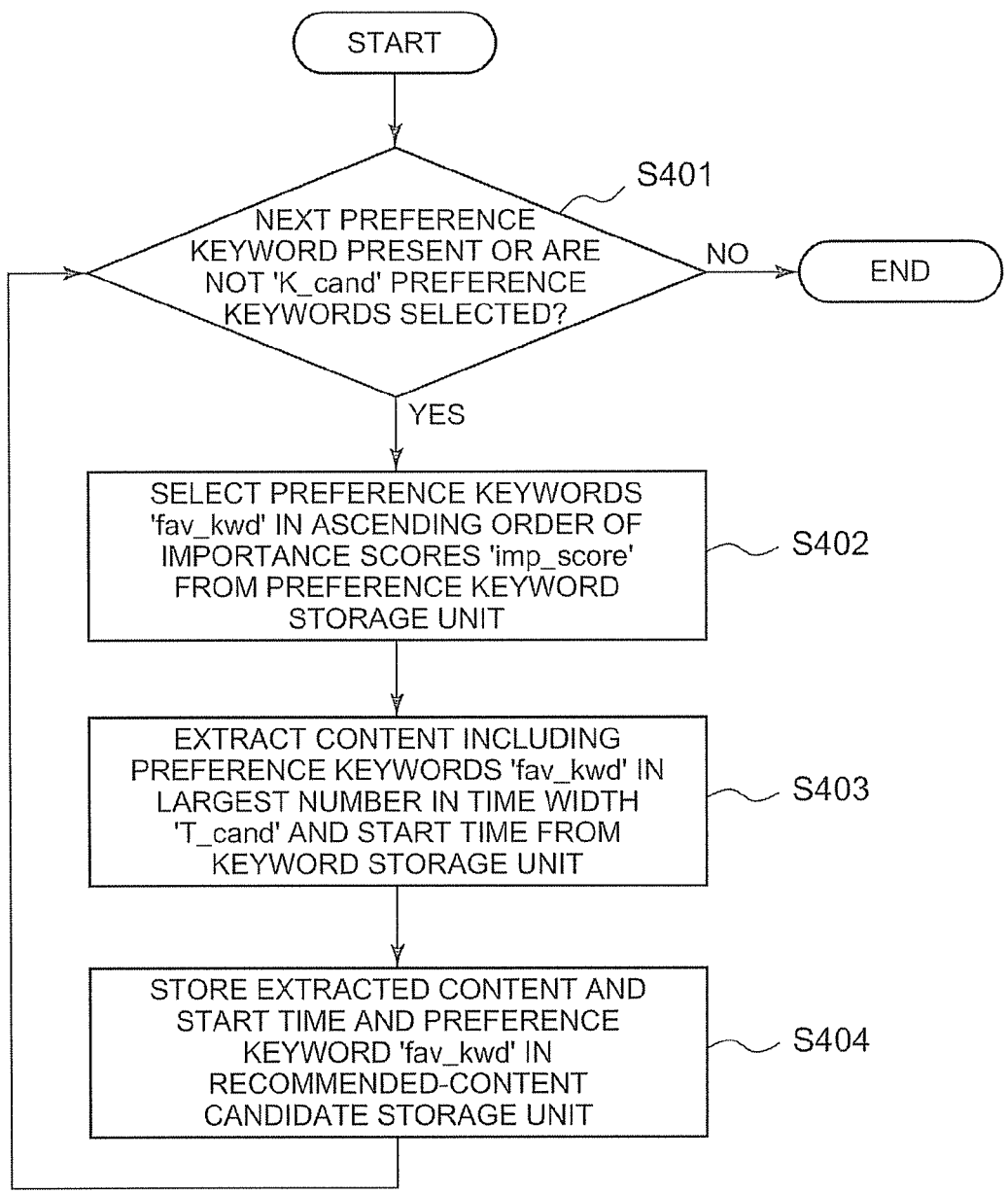
FIG. 4 is a flowchart exemplarily showing an operation performed by a presentation unit according to the first embodiment.

Detailed operation performed by the presentation unit 105 will next be described. The presentation unit 105 extracts recommended content candidates of apparent interest to the user from the contents stored in the content storage unit 111 using the preference keywords stored in the preference keyword storage unit 114, and presents the extracted recommended content candidates to the user. FIG. 4 is an operation flowchart of the presentation unit 105. It is assumed herein that a maximum number of recommended content candidates presented to the user is K_cand. It is also assumed that the time width of each recommended content candidate is T_cand. The detailed operation performed by the presentation unit 105 will be described on the premise that the maximum number and the time width are fixed. Alternatively, the maximum number and the time width can be changed according to precision, a recording capacity and the like for the content candidates recommended to the user. If unselected preference keywords are not stored in the preference keyword storage unit 114 or if the user already selects K_cand preference keywords, the presentation unit 105 finishes performing the operation (S401). If unselected preference keywords remain in the preference keyword storage unit 114 and the number of selected preference keywords does not reach K_cand yet (S401), the presentation unit 105 selects preference keywords fav_kwd in an ascending order of importance scores from the preference keyword storage unit 114 (S402). Next, the presentation unit 105 extracts the content ID of the content including the preference keywords fav_kwd in the largest number in the time width T_cand as well as start time of the time width from the keyword storage unit 113 (S403). For example, if the preference keyword "work subdivision" is selected, then the presentation unit 105 slightly shifts the time width T_cand by the predetermined width and searches a content in a time zone in which the keyword "work subdivision" appears most frequently in all the contents recorded in the keyword storage unit 113. The search method is described herein on the premise that the time width T_cand does not change but only the start time is shifted in a time direction. Alternatively, even if the start time is shifted in the time direction, every scene can overlap with a scene just before the former scene. A method of expanding or reducing the time width T_cand instead of making the time width T_cand fixed, a method of providing different time widths T_cand according to differences in program time length, a method of providing different time widths T_cand according to differences in program types (genres), or a combination of these methods can be used.

Next, the presentation unit 105 stores the content IDs of the extracted contents, the start time, and the preference keywords fav_kwd in the recommended-content candidate storage unit 115. For example, Table 6 shows the data stored in the recommended-content candidate storage unit 115. The presentation unit 105 stores the preference keywords fav_kwd selected by the management unit 104, content IDs extracted from the preference keywords fav_kwd, and the start time of the respective recommended content candidates. Finally, the presentation unit 105 presents K_cand recommended content candidates based on the content IDs and the start time stored in the recommended-content candidate storage unit 115. FIGS. 5 and 6 show examples of a presentation method. For example, as shown in FIG. 5, an image indicating the start time or the like of each recommended content candidate is displayed as a thumbnail and the presentation unit 105 can present the thumbnail as well as the other information such as a title of the content to the user. The presentation method can be combined with a method, for example, of starting playing the recommended scene candidate if the user clicks on an image. A plurality of images (still images in this embodiment) at the start time can be displayed simultaneously. Still images can be switched over at predetermined time's intervals similarly to a slideshow or can be associated with play and display of a part of moving images. As shown in FIG. 6, the recommended content candidates can be displayed together with the preference keywords based on which the candidates are extracted.

Figure 7:
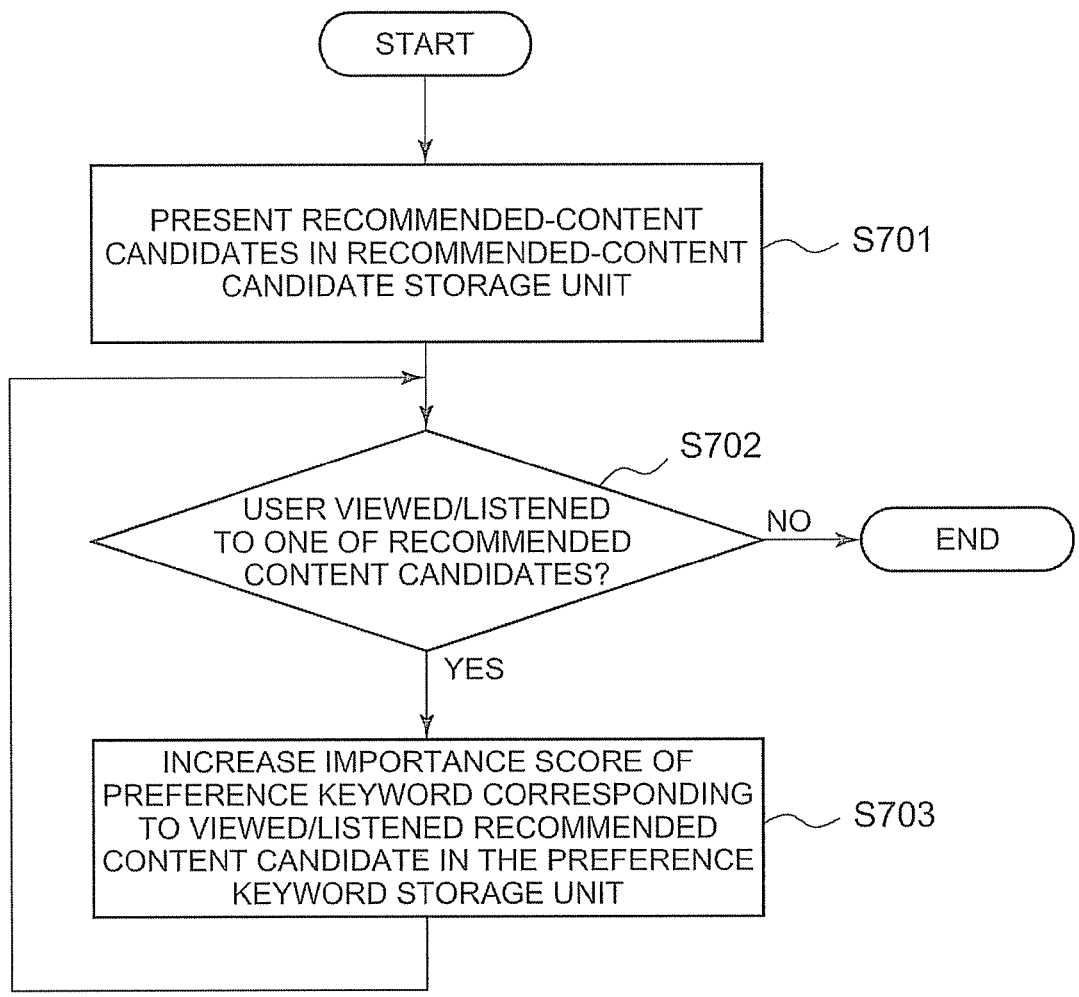
FIG. 7 is a flowchart exemplarily showing an operation performed by an update unit according to the first embodiment.

The operation performed by the update unit 106 will be described in detail. The update unit 106 acquires the history if the user views/listens to the presented recommended content candidates and updates the importance score. FIG. 7 is an operation flowchart of the update unit 106. First, the presentation unit 105 presents the recommended content candidates to the user (S701), and the update unit 106 changes the importance score depending on whether or not the user selects one of the recommended content candidates. That is, if the user actually views/listens to one of the recommended content candidates from among the recommended content candidates (S702), the update unit 106 increases the importance score of the preference keyword corresponding to the viewed/listened recommended content candidate in the preference keyword storage unit 114 (S703). For example, if the user views/listened to the recommended content candidate extracted using the favorite word "work subdivision", the update unit 106 increases the importance score of the "work subdivision" as shown in Table 8 in the preference keyword storage unit 114. In this case, the update unit 106 increases the importance score of the "work subdivision" by 0.2. In FIG. 7, the update unit 106 identifies the preference keyword ("work subdivision" in this embodiment) corresponding to the recommended content candidate played by the user, and increases the importance score of the preference keyword by the preset value. If the user "stops viewing/listening to" the recommended content candidate "halfway", for example, the update unit 106 can decrease the importance score of the preference keyword corresponding to the scene. In this case, the update unit 106 changes the importance score of the preference keyword "work subdivision" shown in Table 5 to 0.8. Alternatively, an increase value or a decrease value can be determined according to a predetermined rule. For example, the update unit 106 can update the importance score according to the rule that 0.2 is added to the importance score if the user plays the recommended content candidate till the end, the importance score is subtracted by 0.1 if the user stops playing the candidate halfway (for example, stops playing the candidate after playing more than a half of the candidate), and the importance score is subtracted by 0.2 if the user stops playing the candidate right after starting playing (for example, a case that the user performs an erroneous operation can apply). Since the user possibly selects a plurality of recommended content candidates, it is desirable to make an evaluation according to the user's preference under a plurality of conditions and to update the importance score of the preference keyword by a combination of increase and decrease of the importance score as stated above.

TABLE 8

| Preference keyword | Importance Score |
| --- | --- |
| Work subdivision | 1.2 |
| Table | 1.0 |
| Subdividing person | 1.0 |
| Committee member in charge | 1.0 |
| XX | 1.0 |
| Special agreement | 1.0 |
| XX | 1.0 |

TABLE 8-continued

| Preference keyword | Importance Score |
|---|---|
| Ill-considered budget | 1.0 |
| XX Ministry | 1.0 |
| ... | |

Figure 8:
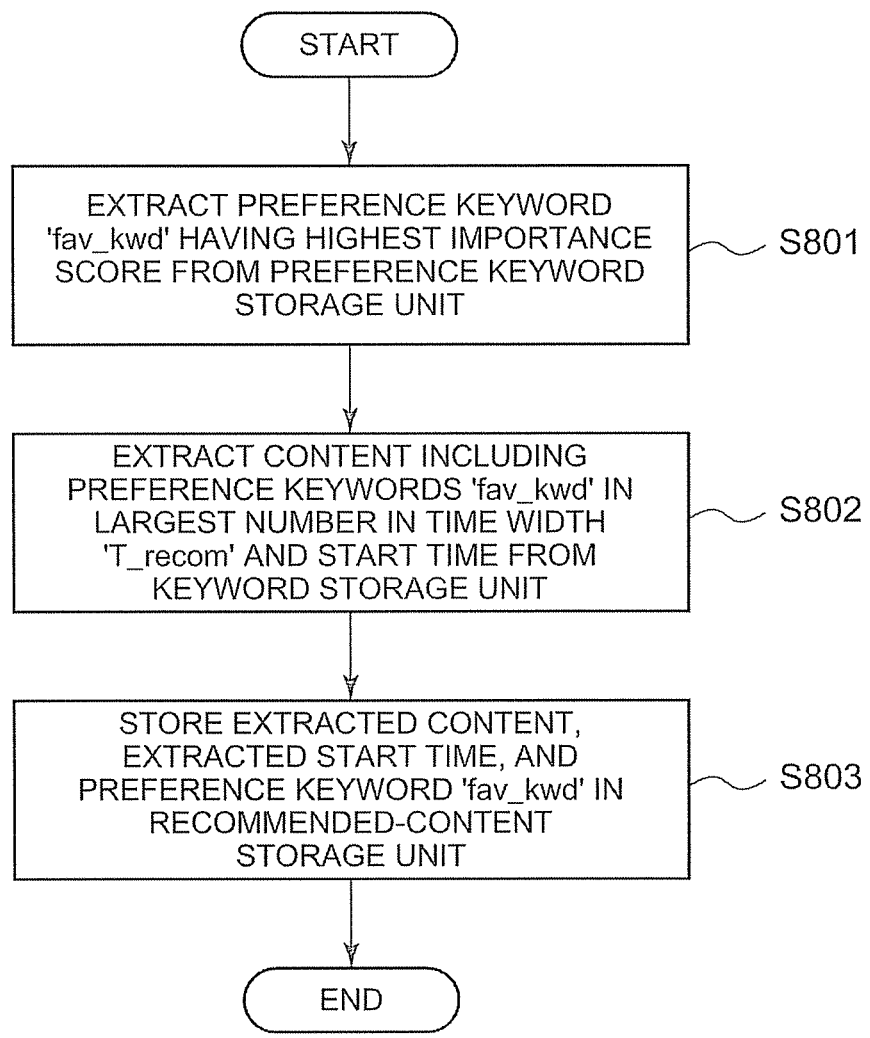
FIG. 8 is a flowchart exemplarily showing an operation performed by a second extraction unit according to the first embodiment.

The second extraction unit 107 presents the user with the recommended content of interest to the user based on a result of user's viewing/listening to the recommended content candidates. FIG. 8 is an operation flowchart of the second extraction unit 107. A time width of the recommended content is assumed as T_recom. First, the second extraction unit 107 extracts the preference keyword fav_kwd having the highest importance score from the preference keywords stored in the preference keyword storage unit 114 (S801). For example, the second extraction unit 107 extracts the preference keyword "work subdivision" having the highest importance score 1.2 in an example of Table 8. Next, the second extraction unit 107 extracts the content including the preference keywords fav_kwd in the largest number in the time width T_recom and the start time from the keyword storage unit 113 (S802). The second extraction unit 107 stores the extracted content, start time, and preference keyword fav_kwd in the recommended-content storage unit 116 (S803). For example, if the second extraction unit 107 extracts the start time 0:25:28 of the content having the content ID 035 from the keyword storage unit 114 using the preference keyword "work subdivision" extracted in the step S801, the information on the recommended content is stored in the recommended-content storage unit 116 as shown in Table 7.

According to this embodiment, the content processing device identifies the keyword of interest to the user by determining which video (or scene) among the recommended content candidates the user views/listens to. Therefore, the scene extracted using the identified keyword corresponds to the scene of interest to the user and it is possible to recommend the content that meets the user's preference to the user.

Second Embodiment

A content processing device according to a second embodiment of the present invention will be described with reference to the drawings. The second embodiment differs from the first embodiment in the update method for the importance score executed by the management unit 104. Operations performed by the second acquisition unit 102 and the history storage unit 112 based on which the update operation is performed as well as the management unit 104 will be mainly described. Constituent elements of the content processing device according to the second embodiment equivalent to those according to the first embodiment are denoted by the same reference symbols or names and not repeatedly described herein.

Figure 9:
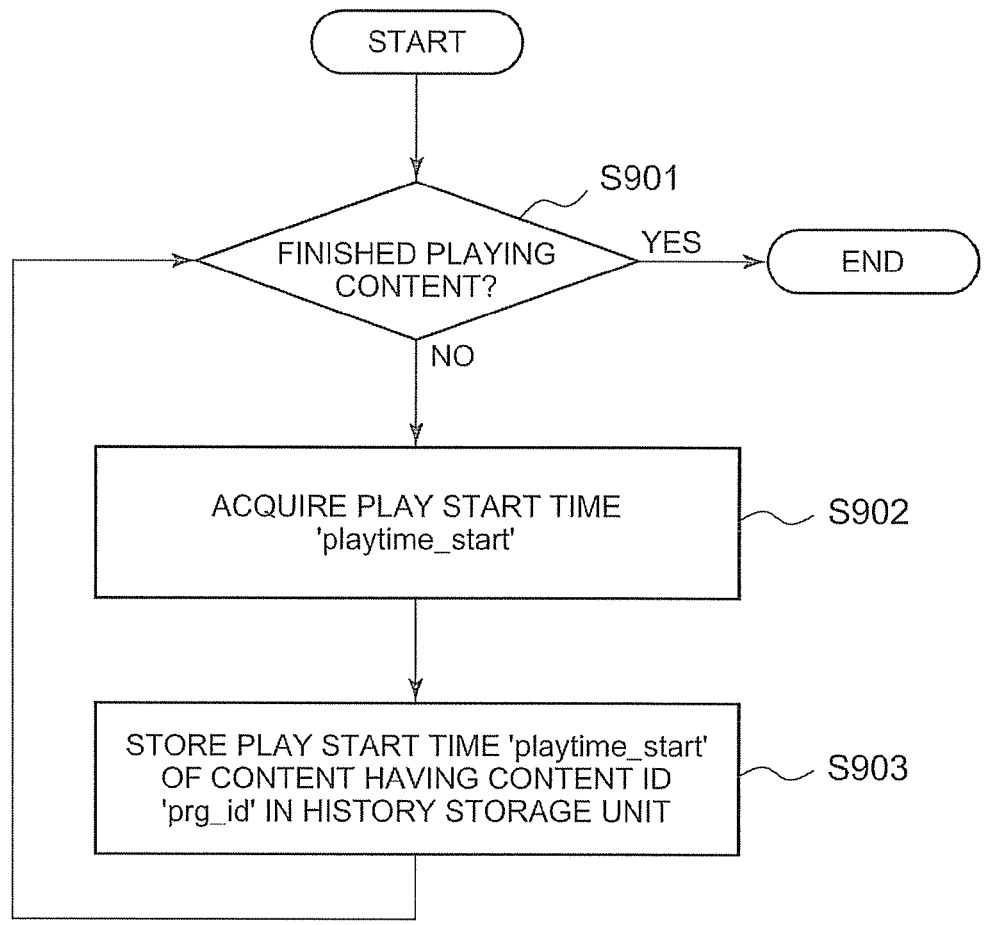
FIG. 9 is a flowchart exemplarily showing an operation performed by a second acquisition unit according to a second embodiment of the present invention.

The second acquisition unit 102 acquires the operational history during the viewing/listening if the user views/listens to a content and stores the acquired content in the history storage unit 112. The operation performed by the second acquisition unit 102 will be described with reference to FIG. 9 while assuming that the user views/listens to the content having the content ID=prg_id. FIG. 9 is an operation flowchart of the second acquisition unit 102.

If the user has not finished playing the content (S901), the second acquisition unit 102 acquires normal play start time (playtime_start) (S902). The "normal play start time" means time when a normal play operation other than the fast-forward and a rewinding operations is explicitly performed. For example, if the fast-forward operation is performed at the start of playing the content, the normal play operation is performed at specific time t to stop the fast-forwarding, and normal play is started, then the time t is the value of playtime_start.

Next, the second acquisition unit 102 stores the play start time playtime_start as well as the content that is being viewed/listened to by the user with the content ID=prg_id in the history storage unit 112 (S903). At this time, since the playtime_start is the time when the user performs the normal play operation, a plurality of playtime_start is often obtained by one play processing. If a plurality of playtime_start is obtained, the second acquisition unit 102 stores a plurality of pairs of prg_id and playtime_start in the history storage unit 112. If the user finishes playing the content (S901), the operation ends.

The history storage unit 112 is a database storing the user's content-viewing/listening and operational histories acquired by the second acquisition unit 102. Table 9 shows an example of data stored in the history storage unit 112. A content ID corresponds to the content ID of the content stored in the content storage unit 111. Normal play start time indicates time when the user starts performing the normal play operation (not fast-forward or rewinding operation). If the user performs a plurality of operations, a plurality of normal play start time is stored in the history storage unit 112.

TABLE 9

| Content ID | Normal play start time |
|---|---|
| 001 | 0:10:32 |
| 001 | 0:25:03 |
| ... | |

Figure 10:
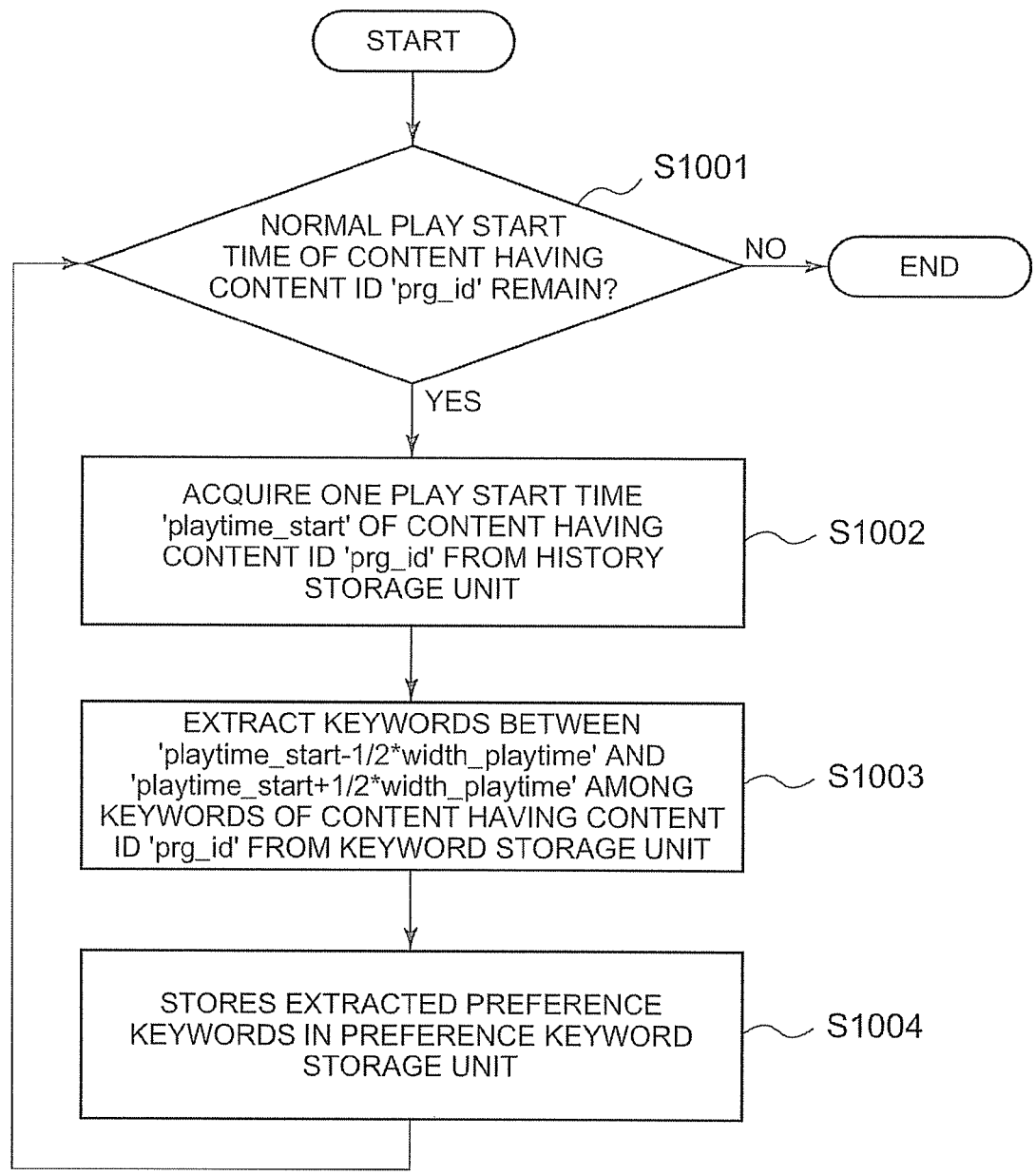
FIG. 10 is a flowchart exemplarily showing an operation performed by a management unit according to the second embodiment.

The management unit 104 extracts preference keywords of interest to the user from the scene-viewing/listening and operational histories stored in the history storage unit 112. FIG. 10 is an operation flowchart of the management unit 104. If normal play start time of the content having the content ID prg_id and viewed/listened to by the user remains in the history storage unit 112 (S1001), the management unit 104 acquires one normal play start time playtime_start of the content having the content ID prg_id from the history storage unit 112 (S1002). In the example of Table 9, the management unit 104 acquires play start time playtime_start=0:10:32 of the content having the content ID 001 played just previously. Next, the management unit 104 extracts keywords between the playtime_start−½*width_playtime and playtime_start+½*width_playtime among the keywords of the content having the content ID prg_id from the keyword storage unit 113 (S1003). It is to be noted that width_playtime is a preset value, which specifies a time width before and after the start of normal play. For example, if width_playtime=60 seconds, the time width of each extracted keyword is from 0:10:02 to 0:11:02.

For example, in Table 3, the keywords present between 0:10:02 and 0:11:02 of the content having the content ID 001 include "XX", "special agreement", "YY", "ill-considered budget", and "ZZ Ministry". The management unit 104 extracts these keywords from text data. These keywords are the ones appearing before or after the user starts the normal play operation. Since it is considered that scenes of interest to the user are included before or after the user starts the normal play operation, the extracted keywords are considered to be preference keywords reflecting user's preferences. Next, the management unit 104 stores the extracted preference keywords in the preference keyword storage unit 114 (S1004). At the time of storing each preference keyword in the preference keyword storage unit 114, if the keyword is new, the management unit 104 also stores 1.0 in the preference keyword storage unit 114 as the importance score of the new preference keyword. If the preference keyword is already stored in the preference keyword storage unit 114 and the already-stored importance score imp_score_old>1.0 (that is, the already-stored importance score is higher than 1.0), the management unit 104 sets the new importance score imp_score_new equal to the already-stored importance score, that is, imp_score_new=imp_score_old. If imp_score_old<=1.0 (that is, the already-stored importance score is equal to or lower than 1.0), the management unit 104 sets the new importance score imp_score_new to 1.0, that is, imp_score_new=1.0. If the normal play start time of the content having the content ID prg_ida does not remain in the preference keyword storage unit 114 (S1001), the management unit 104 finishes performing the operation.

Furthermore, if the keyword included only in the content viewed/listened to by the user is selected as the preference keyword, it is possible to recommend a content more suited for user's preferences. For example, if the user has his/her impression that "the content was not so interesting although being played", the user stops viewing/listening to the content halfway. Furthermore, if the user did not fast-forward the video in at least a time zone in which the scene includes the preference keyword, the preference keyword is considered to reflect user's preferences. It is effective to recommend a content using the keyword included only in the content viewed by the user as the preference keyword. Moreover, the importance score of the preference keyword can be adjusted by adding a function to score points to each scene (rate each scene) as being never fast-forwarded or being viewed/listened to till the end.

According to this embodiment, the content processing device identifies the keyword of interest to the user by determining which video (or scene) among the recommended content candidates the user views/listens to. Therefore, the scene extracted using the identified keyword corresponds to the scene of interest to the user and it is possible to recommend the content that meets the user's preferences to the user. Besides, by selecting the keyword before or after starting the normal play operation as the preference keyword, it is possible to select the preference keyword included in the content of more interest to the user and recommend the content that meets the user's preferences.

Third Embodiment

A content processing device according to a third embodiment of the present invention will be described with reference to the drawings. In the third embodiment, an instance in which the number of preference keywords used for extracting recommended contents is two or more will be described. Thus, the second extraction unit 107 extracting the recommended contents and presenting the recommended contents to the user will be mainly described herein. Constituent elements of the content processing device according to the third embodiment equivalent to those according to the first embodiment are denoted by the same reference symbols or names and not repeatedly described herein.

Figure 11:
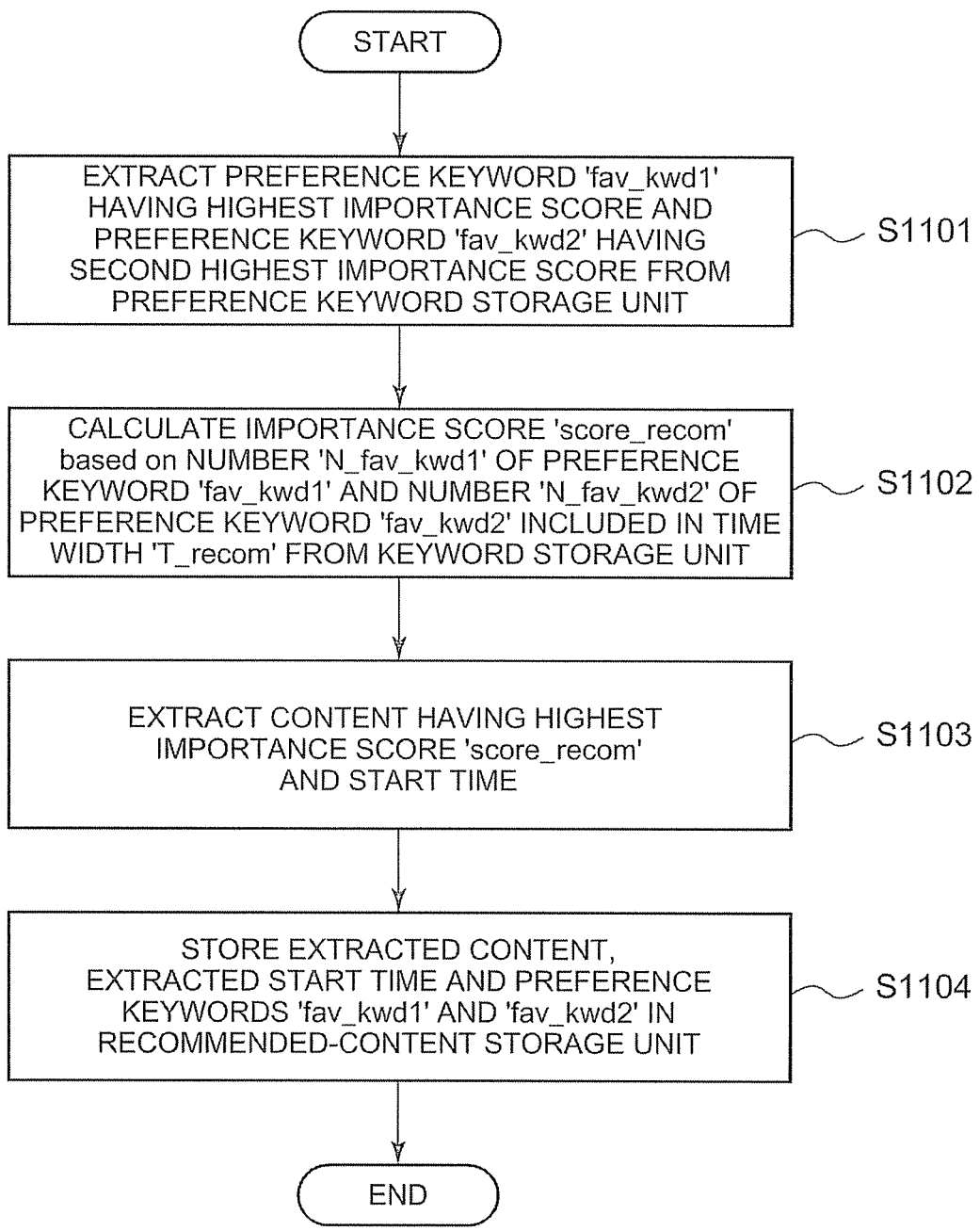
FIG. 11 is a flowchart exemplarily showing an operation performed by a second extraction unit according to a third embodiment.

The second extraction unit 107 extracts a recommended content of interest to the user based on a result of user's viewing recommended-content candidates and presents the recommended content to the user. FIG. 11 is an operation flowchart of the second extraction unit 107. In this embodiment, an instance in which the number N_fav_keyword of a plurality of preference keywords used for extracting a recommended scene is two will be described by way of example. It is assumed that the recommended scene has a time width of T_recom.

First, the second extraction unit 107 selects N_fav_keyword preference keywords in an ascending order of importance scores from among preference keywords stored in the preference keyword storage unit 114 (S1101). If N_fav_keyword=2, fav_kwd1 and fav_kwd2 are allocated to the preference keywords, respectively. Importance scores of the preference keywords fav_kwd1 and fav_kwd2 are set to S_fav_kwd1 and S_fav_kwd2, respectively. Table 10 shows a state of a table of the preference keyword storage unit 114. For example, the second extraction unit 107 extracts the preference keyword fav_kwd1 "work subdivision" having the highest importance score S_fav_kwd=1.6 and the preference keyword fav_kwd2 "subdividing person" having the second highest importance score S_fav_kwd2=1.4. Next, the second extraction unit 107 calculates the numbers (N_fav_kwd1 and N_fav_kwd2) of the respective preference keywords fav_kwd1 and fav_kwd2 in the time width T_recom from the keyword storage unit 113 (S1102). It is to be noted that score_recom is defined as follows.

$$\text{score\_recom} = S\_fav\_kwd1 * N\_fav\_kwd1 + 2\_fav\_kwd2 * N\_fav\_kwd2$$

TABLE 10

| Preference keyword | Importance Score |
|---|---|
| Work subdivision | 1.6 |
| Table | 0.8 |
| Subdividing person | 1.4 |
| Committee member in charge | 1.0 |
| XX | 0.8 |
| Special agreement | 1.0 |
| XX | 1.2 |
| Ill-considered budget | 1.2 |
| XX Ministry | 1.0 |
| ... | |

Next, the second extraction unit 107 extracts the content having the highest importance score score_recom and the start time (S1103). The second extraction unit 107 then stores the extracted content and start time and preference keywords fav_kwd in the recommended-content storage unit 116 (S1104). For example, if the second extraction unit 107 extracts the start time 0:05:31 of the content having the content ID 021 from the keyword storage unit 112 using the preference keywords "work subdivision" and "subdividing person", information on the recommended content is stored in the recommended content storage unit 116 as shown in Table 11 below.

TABLE 11

| Preference keyword | Content ID | Start time |
|---|---|---|
| Work subdivision, subdividing person | 021 | 0:05:31 |
| ... | | |

The content processing device according to each of the first to third embodiments includes a control device such as a CPU (Central Processing Unit), storage devices such as a ROM (Read Only Memory) and RAM, a communication I/F connecting the content processing device to a network to hold a communication, an external storage device such as a HDD (Hard Disk Drive) or CD (Compact Disc) drive, a display device such as a display presenting contents for content recommendation, input devices such a keyboard and a mouse for user's selecting contents or the like, a bus connecting the respective constituent elements. The content processing device has a hardware configuration using an ordinary computer.

A content processing program executed by the content processing device according to each of the first to third embodiments can be provided while being recorded in a computer-readable recording medium such as a CD-ROM (Compact Disk Read Only Memory), a flexible disk (FD), a CD-R (Compact Disk Recordable) or a DVD (Digital Versatile Disk) as a file in an installable format or an executable format.

Moreover, the processing program executed by the content processing device according to each of the first to third embodiments can be configured to be stored in a computer connected to such a network as the Internet and to be provided by being downloaded via the network. Alternatively, the processing program executed by the content processing device according to each of the first to third embodiments can be configured to be provided or distributed via the network such as the Internet.

In another alternative, the information processing program according to each of the first to third embodiments can be configured to be provided by being incorporated in the ROM or the like in advance.

According to each of the first to third embodiments of the present invention, the content processing device identifies the keyword of interest to the user by determining which video (or scene) among the recommended content candidates the user views/listens to. Therefore, the scene extracted using the identified keyword corresponds to the scene of interest to the user and it is possible to recommend the content that meets the user's preferences to the user. Besides, by selecting the keyword before or after starting the normal play operation as the preference keyword, it is possible to select the preference keyword included in the content of more interest to the user and recommend the content that meets the user's preferences to the user.

The present invention is not limited to the embodiments stated so far but can be carried out by modifying the constituent elements without departure from the scope of the present invention in a working phase. Moreover, various inventions can be created by appropriate combinations of a plurality of constituent elements disclosed in the embodiments stated so far. For example, some of the constituent elements can be deleted from the overall constituent elements shown in the embodiments. Besides, the constituent elements in the different embodiments can be appropriately combined.

Description of Reference Numerals

What is claimed is:

1. A content processing device comprising:
a first acquisition unit acquiring a content data having a plurality of scenes;
a second acquisition unit acquiring a history of a play operation selected by a user from one of a normal play, a fast forward play, a slow play, a repetitive play, a clipping of a scene in an editable device or a chapter setting to a specific scene, including a play start time when the user starts playing the scene of the content data and a play end time when the user finishes playing the scene of the content data;
a history storage device of a computer storing the history of the play operation acquired by the second acquisition unit, the history including a plurality of pairs of the play start time and the play end time by the user;
a first extraction unit extracting a keyword from the scene of the content data;
a management unit extracting a preference keyword representing a preference of the user from the keyword based on the history of the play operation stored in the history storage device, and managing the extracted preference keyword with an importance score;
a presentation unit presenting a recommended content data according to a comparison of the keyword and the preference keyword;
an update unit updating the importance score of the preference keyword corresponding to the recommended content data selected by the user; and
a second extraction unit extracting another recommended content data using the updated importance score,
wherein the second extraction unit acquires the content data and the history corresponding to the content data which the user plays, and the management unit adjusts the importance score of the preference keyword based on the history, and executes to score about the scene based on the operation history.

2. The content processing device according to claim 1, wherein the content data further includes a video and a text and said first extraction unit extracts the keyword from the text of the content data.

3. The content processing device according to claim 1, further comprising,
a keyword storage unit storing the keyword extracted by said first extracting unit.

4. The content processing device according to claim 3, further comprising,
a preference keyword storage unit storing the preference keyword extracted by said management unit.

5. The content processing device according to claim 4, further comprising,
a content storage unit storing a plurality of content data, said content data having a content ID respectively.

6. The content processing device according to claim 5, further comprising,
a recommended content candidate storage unit storing the preference keyword and the content ID extracted by said presentation unit according to the comparison of the keyword and the preference keyword;
wherein said presentation unit presents the recommended content data stored in said recommended content candidate storage unit.

7. The content processing device according to claim 1, wherein
the second acquisition unit acquires the content data and the history corresponding to the content data played by the user, and
the management unit extracts the preference keyword based on the history.

8. The content processing device according to claim 1, wherein
the management unit extracts a keyword within predetermined time from the user's play start time or within predetermined time from the user's play end time as the preference keyword.

9. The content processing device according to claim 1, wherein
said management unit selects the keyword included only in the content data played by the user as the preference keyword.

10. The content processing device according to claims 1, wherein
said second extraction unit extracts the another recommended content data using a plurality of preference keywords and the updated importance score.

11. A content processing device comprising:
a first acquisition unit configured to acquire a content having a plurality of scenes including a video and a text;
a second acquisition unit configured to acquire a history of a play operation selected by a user from one of a normal play, a fast forward play, a slow play, a repetitive play, a clipping of a scene in an editable device or a chapter setting to a specific scene, including the user's play start time at which the user starts playing the content and the user's play end time at which the user finishes playing the scene of the content;
a history storage device of a computer storing the history of the play operation acquired by the second acquisition unit, the history including a plurality of pairs of the user's play start time and the user's play end time;
a first extraction unit configured to extract a keyword extracted from the text included in the scene of the content;
a management unit configured to extract a preference keyword representing a preference of the user from the keyword based on the history of the play operation stored in the history storage device, and to manage the extracted preference keyword with a predetermined importance score of the preference keyword;
a presentation unit configured to compare the keyword with the preference keyword, and to extract and to present a recommended-content candidate of the content to the user;
an update unit configured to update the importance score of the preference keyword so as to increase the importance score of the preference keyword corresponding to one of the recommended-content candidates selected by the user; and
a second extraction unit configured to extracts a recommended content using the updated importance score,
wherein the second extraction unit acquires the content and the history corresponding to the content which the user plays, and the management unit adjusts the importance score of the preference keyword based on the history, and executes to score about the scene based on the history.

12. The content processing device according to claim 11, wherein
the second acquisition unit acquires the content and the history corresponding to the content played by the user, and
the management unit extracts the preference keyword based on the history.

13. The content processing device according to claim 11, wherein
the management unit extracts the keyword extracted from the text within predetermined time from the user's play start time or the text within predetermined time from the user's play end time as the preference keyword.

14. The content processing device according to claim 11, wherein
the management unit selects the keyword included only in the content played by the user as the preference keyword.

15. The content processing device according to claim 11, wherein
the second extraction unit extracts the recommended content candidates using a plurality of preference keywords and the importance score.

16. A content processing method comprising:
acquiring a content data having a plurality of scenes;
acquiring a history of a play operation selected by a user from one of a normal play, a fast forward play, a slow play, a repetitive play, a clipping of a scene in an editable device or a chapter setting to a specific scene, including a play start time when the user starts playing the scene of the content data and play end time when the user finishes playing the scene of the content data;
storing the history of the play operation acquired by acquiring the history on a computer readable storage device, the history including a plurality of pairs of the play start time and play end time by the user;
extracting a keyword extracted from the scene of the content data;
extracting a preference keyword representing a preference of the user from the keyword based on the history of the play operation stored in the storing the history;
managing the extracted preference keyword with an importance score;
presenting a recommended content data according to a comparison of the keyword and the preference keyword;
updating the importance score of the preference keyword corresponding to the recommended content data selected by the user; and
extracting another recommended content data using the updated importance score,
wherein the extracting another recommended content data further comprises acquiring the content data and the history corresponding to the content data which the user plays;
the extracting the preference keyword representing the preference of the user further comprises adjusting the importance score of the preference keyword based on the history; and
the managing the extracted preference keyword further comprises executing to score about the scene based on the history.

17. The content processing method according to claim 16, wherein said content data further includes a video and a text, and said extracting a keyword further includes extracting keyword from the text of said content data.

18. The content processing device according to claim 1, wherein the history of the normal play operation is acquired by the second acquisition unit.

19. The content processing device according to claim 1, wherein if viewing/listing to the recommended content data is half way stopped, the update unit decreases the importance score of the preference keyword.

20. The content processing device according to claim 1, wherein the importance score of the preference keyword is adjusted, when the recommended content data is not fast-forwarded or the recommended content data is viewed/listened to till the end.

21. The content processing device according to claim 11, wherein the history of the normal play operation is acquired by the second acquisition unit.

22. The content processing device according to claim 11, wherein if viewing/listing to the recommended content candidate is half way stopped, the update unit decreases the importance score of the preference keyword.

23. The content processing device according to claim 11, wherein the importance score of the preference keyword is adjusted, when the recommended content candidate is not fast-forwarded or the recommended content candidate is viewed/listened to till the end.

24. The content processing method according to claim 16, wherein the history of the normal play operation is acquired by acquiring the history of the play operation.

25. The content processing method according to claim 16, wherein if viewing/listing to the recommended content data is half way stopped, the updating the importance score decreases the importance score of the preference keyword.

26. The content processing method according to claim 16, wherein the importance score of the preference keyword is adjusted, when the recommended content data is not fast-forwarded or the recommended content data is viewed/listened to till the end.

* * * * *